US010216352B2

(12) United States Patent
Liang et al.

(10) Patent No.: US 10,216,352 B2
(45) Date of Patent: Feb. 26, 2019

(54) METHOD, DEVICE, AND STORAGE MEDIUM FOR SELECTING CONTENT OF A WEBPAGE THROUGH AUTOMATICALLY SCROLLING WEBPAGE CONTENT

(71) Applicant: GUANGZHOU UCWEB COMPUTER TECHNOLOGY CO., LTD, Guangzhou (CN)

(72) Inventors: Jie Liang, Guangzhou (CN); Yongfu Yu, Guangzhou (CN); Xiaopeng He, Guangzhou (CN); Shunyan Zhu, Guangzhou (CN); Yongchao Lao, Guangzhou (CN)

(73) Assignee: GUANGZHOU UCWEB COMPUTER TECHNOLOGY CO., LTD, Guangzhou (CN)

( * ) Notice: Subject to any disclaimer, the term of this patent is extended or adjusted under 35 U.S.C. 154(b) by 490 days.

(21) Appl. No.: 14/420,529

(22) PCT Filed: Jun. 27, 2013

(86) PCT No.: PCT/CN2013/078220
§ 371 (c)(1),
(2) Date: Feb. 9, 2015

(87) PCT Pub. No.: WO2014/023140
PCT Pub. Date: Feb. 13, 2014

(65) Prior Publication Data
US 2015/0220241 A1 Aug. 6, 2015

(30) Foreign Application Priority Data
Aug. 10, 2012 (CN) .......................... 2012 1 0287282

(51) Int. Cl.
*G06F 3/048* (2013.01)
*G06F 3/041* (2006.01)
(Continued)

(52) U.S. Cl.
CPC ........ *G06F 3/04812* (2013.01); *G06F 3/0488* (2013.01); *G06F 3/04842* (2013.01); *G06F 17/2247* (2013.01)

(58) Field of Classification Search
CPC . G06F 3/048; G06F 3/041; G06F 3/00; G06F 17/00
See application file for complete search history.

(56) References Cited

U.S. PATENT DOCUMENTS 5,611,060 A * 3/1997 Belfiore ................ G06F 3/0485
715/819
7,934,166 B1 * 4/2011 Clark .................... G06F 3/0485
715/784
(Continued)

FOREIGN PATENT DOCUMENTS

CN 1624640 A 6/2005
CN 101068411 A 11/2007
(Continued)

OTHER PUBLICATIONS

NPL YouTube Drag and Drop, May 12, 2006 (Year: 2006).*
NPL Microsoft Computer Dictionary Fifth Edition, Drag Definition, pp. 1-3, 2002 (Year: 2002).*

*Primary Examiner* — Hugo Molina
(74) *Attorney, Agent, or Firm* — Anova Law Group, PLLC

(57) ABSTRACT

Method, device, and storage medium for selecting edge content of a webpage. The method includes, upon detecting that a user performs the operation of dragging the cursor part of the two cursors used to define a selection area toward a screen edge of a touch-screen of a mobile terminal, moving the cursor toward the screen edge of the touch-screen; determining whether the distance between the screen edge and the cursor part after the movement of the cursor is within a first predetermined distance; and, when within the first (Continued)

predetermined distance, triggering the content webpage to move in an opposite direction.

12 Claims, 5 Drawing Sheets

(51) Int. Cl.
    *G06F 17/00*     (2006.01)
    *G06F 3/0481*     (2013.01)
    *G06F 3/0488*     (2013.01)
    *G06F 3/0484*     (2013.01)
    *G06F 17/22*     (2006.01)

(56) References Cited

U.S. PATENT DOCUMENTS

| | | | |
|---|---|---|---|
| 2006/0212790 A1* | 9/2006 | Perantatos | G06F 3/0486 |
| | | | 715/234 |
| 2009/0228842 A1* | 9/2009 | Westerman | G06F 3/04883 |
| | | | 715/863 |
| 2010/0289757 A1 | 11/2010 | Budelli | |
| 2011/0310026 A1* | 12/2011 | Davis | G06F 3/0488 |
| | | | 345/173 |
| 2012/0066591 A1 | 3/2012 | Hackwell | |
| 2012/0229397 A1* | 9/2012 | Cho | G06F 3/0488 |
| | | | 345/173 |
| 2012/0311437 A1* | 12/2012 | Weeldreyer | G06F 3/0488 |
| | | | 715/252 |
| 2013/0042199 A1* | 2/2013 | Fong | G06F 3/0488 |
| | | | 715/780 |
| 2013/0290906 A1* | 10/2013 | Thorsander | G06F 3/0488 |
| | | | 715/835 |
| 2014/0040833 A1* | 2/2014 | McLean | G06F 3/0488 |
| | | | 715/856 |

FOREIGN PATENT DOCUMENTS

| | | |
|---|---|---|
| CN | 101192121 A | 6/2008 |
| CN | 101398739 A | 4/2009 |
| CN | 101526881 A | 9/2009 |
| CN | 101689092 A | 3/2010 |
| CN | 101710268 A | 5/2010 |
| CN | 101963887 A | 2/2011 |
| CN | 102207815 A | 10/2011 |
| CN | 102349046 A | 2/2012 |
| CN | 102902454 A | 1/2013 |

* cited by examiner

METHOD, DEVICE, AND STORAGE MEDIUM FOR SELECTING CONTENT OF A WEBPAGE THROUGH AUTOMATICALLY SCROLLING WEBPAGE CONTENT

This application is a national stage application of PCT patent application No. PCT/CN2013/078220, filed on Jun. 27, 2013, which claims the priority of Chinese patent application No. 201210287282.9, namely "Method and Device for Selecting Webpage Edge Content, and Mobile Terminal", filed on Aug. 10, 2012 at Chinese Patent Office, and the entirety of which is incorporated herein by reference.

FIELD OF THE INVENTION

The present invention generally relates to the field of mobile communication and, more particularly, to a webpage edge content selection method and device on a mobile terminal and a mobile terminal with such device.

BACKGROUND

As technology progresses, especially as touch-screen technology advances, through browsers installed on mobile terminals and using touch-screen technology to browse and process webpages is becoming a trend. Conventionally, because the width of webpage content is often wider than that of a mobile terminal screen, as illustrated in FIG. 1 and FIG. 2, when a webpage is displayed on a mobile terminal screen, a portion of the webpage content usually extends out of the mobile terminal screen and is not displayed on the screen. Therefore, to browse the entire content of a webpage, a user often needs to scroll the webpage contents up-and-down and left-to-right along the mobile terminal screen during display, and to select contents to be operated upon from the displayed contents for webpage processing.

Specifically, when the browser enters into a text selection mode (e.g., webpage browsing), one or more cursors (e.g., two cursors) appear on the screen of the mobile terminal for user to scroll the screen up-and-down or left-and-right to display the content that is not displayed on the current screen of the mobile terminal. However, under such circumstance, when trying to select contents at the edge of the mobile terminal screen, the user is not able to drag the cursor further when the cursor reaches the edge. It may cause the content of the content webpage that is not displayed on the current screen not being able to be selected. Furthermore, when the edge of the touch-screen is not sensitive, the user is not able to select the content at the edge of the current screen. To solve this problem, a preferred solution provides a magnifier function, as shown in FIG. 2 with "This" text being magnified, for displaying the edge being magnified several times when the cursor is dragged around.

However, due to the incompleteness of sensing units at the edge of capacitive touch-screen and the absence of half of weight signals when a user finger touches the edge of the screen, as the user selects the edge content of the content webpage, it may cause difficulty for selecting the edge content or even make it impractical.

BRIEF SUMMARY OF THE INVENTION

The present invention provides a method, a device and a mobile terminal for selecting the edge content of a content webpage in order to solve the technical problem of lower user satisfaction when selecting the edge content of the content webpage.

In order to solve the above technical problem, the present invention provides the following technical solutions.

In one aspect, the present invention provides a method for selecting and processing an edge content of a content webpage. The method includes the followings.

The browser client detects locations of at least two cursors configured for user to select a content area from a content webpage on the touch-screen of a mobile terminal and movement of one of every two cursors toward the screen edge of the touch-screen.

When the distance between a location of the screen edge and the location of the cursor after the movement of the cursor is within a first predetermined distance, the content webpage is triggered to move in a direction opposite to the direction of the movement of the cursor.

In one embodiment, the method also includes: when the location of the cursor after the movement of the cursor reaches the location of the content edge of the content webpage, the content webpage is moved further in a direction opposite to the direction of the movement of the cursor by a second predetermined distance, bringing the edge of the content closer to the center of the screen than the edge of the screen.

In one or more embodiments, detecting locations of at least two cursors configured for user to select a content area from a content webpage on the touch-screen of a mobile terminal includes the followings.

Detecting the location of the preset marker displayed on the predetermined area of the touch-screen of a mobile terminal being clicked by a user; or Detecting the location of the cursor being dragged by the user on the touch-screen in a horizontal or a vertical direction.

In one or more embodiments, a preset marker may be an upward, a downward, a leftward or a rightward arrow displayed on the touch-screen of a mobile terminal.

In another aspect, the present invention provides a method for selecting and processing the edge content of the content webpage on a mobile terminal, including: when detecting on the touch-screen of a mobile terminal that a user performs the operation of dragging the cursor part of the two cursors used to define the selection area toward the screen edge of the touch-screen, the browser client moves the cursor part toward the screen edge; the browser client determines whether the distance between the screen edge in the direction of the movement of the cursor and the cursor part after the movement of the cursor is within the first predetermined distance; when the distance between the screen edge in the direction of the movement of the cursor and the cursor part after the movement of the cursor is within the first predetermined distance, the content webpage is triggered to move in the direction opposite to the direction of the movement of the cursor; and the browser client moves the content webpage in the opposite direction, wherein, when the cursor part reaches the content edge of the content webpage, the content webpage is moved further in the opposite direction by the second predetermined distance, bringing the edge of the content edge closer to the center of the screen than the edge of the screen.

In one or more embodiments, when the user performs the operation of dragging the cursor part of the two cursors used to define the selection area toward the screen edge of the touch-screen, the operation may be that the user clicks a preset marker displayed on the predetermined area of the touch-screen of a mobile terminal.

In one or more embodiments, the preset marker may be the upward, the downward, the leftward or the rightward arrow displayed on the touch-screen of a mobile terminal.

In one or more embodiments, when the user performs the operation of dragging the cursor part of the two cursors used to define the selection area toward the screen edge of the touch-screen, the operation may be that the user drags the cursor part on the touch-screen in the horizontal or the vertical direction.

In another aspect, the present invention provides a device for selecting and processing the edge content of a content webpage. The device includes the followings.

A detecting unit is configured to detect locations of at least two cursors used for user to select the content area from a content webpage on the touch-screen of a mobile terminal and movement of one of each two cursors toward the location of the screen edge of the touch-screen.

A triggering unit is configured to trigger the content webpage to move in the direction opposite to the direction of the movement of the cursor when the distance between the location of the screen edge and the location of the cursor after the movement of the cursor is within the first predetermined distance.

In one embodiment, the device further includes the following.

A content webpage moving unit is configured to, when the location of the cursor after the movement of the cursor reaches the location of the content edge of the content webpage, move the content webpage further in the opposite direction by the second predetermined distance, bringing the edge of the content closer to the center of the screen than the edge of the screen.

In one or more embodiments, the detecting unit detects locations of at least two cursors used by the user to define the selection area on the content webpage on the touch-screen of a mobile terminal by the following operations.

Detecting the location of the preset marker displayed on the predetermined area of the touch-screen of a mobile terminal; or Detecting the location of the cursor being dragged by the user on the touch-screen in the horizontal or the vertical direction.

In another aspect, the present invention provides a device for selecting and processing the edge content of a content webpage, including: a cursor moving unit configured to, upon detecting that the user performs the operation of dragging the cursor part of the two cursors used to define the selection area toward the screen edge of the touch-screen on the touch-screen of a mobile terminal, move the cursor part toward the screen edge; a determining unit configured to determine if the distance between the screen edge in the direction of the movement of the cursor and the cursor part after the movement of the cursor is within the first predetermined distance; a triggering unit configured to trigger the content webpage to move in the direction opposite to the direction of the movement of the cursor when the distance between the screen edge in the direction of the movement of the cursor and the cursor part after the movement of the cursor is within the first predetermined distance; and a content webpage moving unit configured to move the content webpage in the opposite direction, wherein, when the cursor part reaches the content edge of the content webpage, the content webpage moving unit is configured to move the content webpage further in the opposite direction by the second predetermined distance, bringing the edge of the content closer to the center of the screen than the edge of the screen.

In one or more embodiments, when the user performs the operation of dragging the cursor part of the two cursors used to define the selection area toward the screen edge of the touch-screen, the operation may be that the user clicks the preset marker displayed on the predetermined area on the touch-screen of a mobile terminal.

In one or more embodiments, the preset marker may be the upward, the downward, the leftward or the rightward arrow.

In one or more embodiments, when the user performs the operation of dragging the cursor part of the two cursors used to define the selection area toward the screen edge of the touch-screen, the operation may be that the user drags the cursor part on the touch-screen in the horizontal or the vertical direction.

In another aspect, the present invention provides a mobile terminal, which includes the above described device.

In another aspect, the present invention provides a computer readable medium storing processor-executable program code, when being executed, for the processor to perform the following procedures.

The processor detects locations of at least two cursors used for user to select content area from a content webpage on the touch-screen of a mobile terminal and movement of one of every two cursors toward the screen edge of the touch-screen.

When the distance between the location of the screen edge and the location of the cursor after the movement of the cursor is within the first predetermined distance, the processor triggers the content webpage to move in the direction opposite to the direction of the movement of the cursor.

Using the above described browser based webpage moving control method and device, when the user drags the cursor part of the two cursors used to define the selection area toward the screen edge of the touch-screen, or when the user drags one of each pair of at least two cursors used to define the selection area toward the screen edge of the touch-screen, through moving the cursor part used to define the selection area or one of each pair of the cursors toward the screen edge, when the distance between the screen edge and the cursor part after the movement of the cursor is within the first predetermined distance, the content webpage is triggered to move in the opposite direction. And when the cursor part reaches the content edge of the content webpage, the content webpage is moved further in the opposite direction, bringing the edge of the content closer to the center of the screen than the edge of the screen. This helps user to select the text at the screen edge more effectively and to avoid the problem whereby selecting the text at the screen edge is difficult or even impossible when some inferior capacitive touch-screen devices are used.

In order to achieve the foregoing and related objectives, one or more aspects of the present invention include the features described later in detail and specifically indicated in the claims. The following description and the accompanying drawings illustrate in detail certain embodiments of the present invention. However, these aspects are only some of many variations of the embodiments based on the principles of the present invention. Further, the present invention is intended to include all such aspects and their equivalents.

BRIEF DESCRIPTION OF THE DRAWINGS

According to the following detailed description with reference to the accompanying drawings, the foregoing and other objectives, features and advantages of the present invention will become easily understood. In the drawings.

In all drawings, the same reference numerals indicate similar or corresponding features or functions.

DETAILED DESCRIPTION

The followings, together with accompanying drawings, describe in detail certain embodiments of the present invention.

Figure 1:
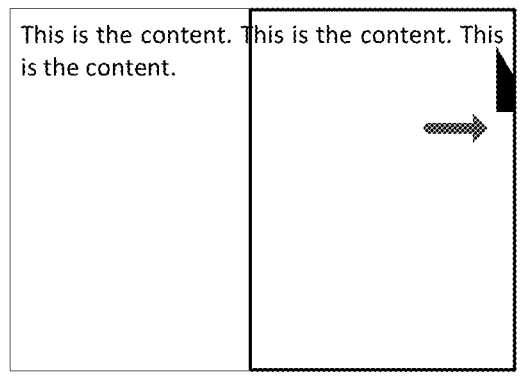
FIG. 1 illustrates a schematic diagram of a conventional webpage content selection method.
Figure 2:
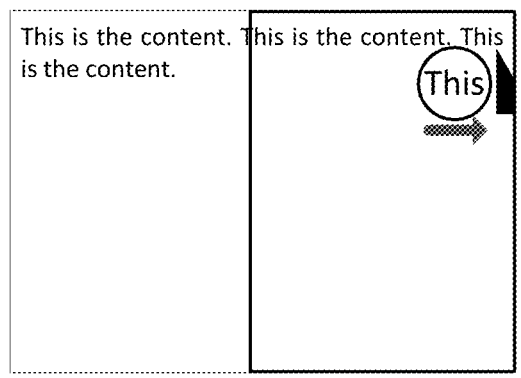
FIG. 2 illustrates a schematic diagram of another conventional webpage content selection method.
Figure 3:
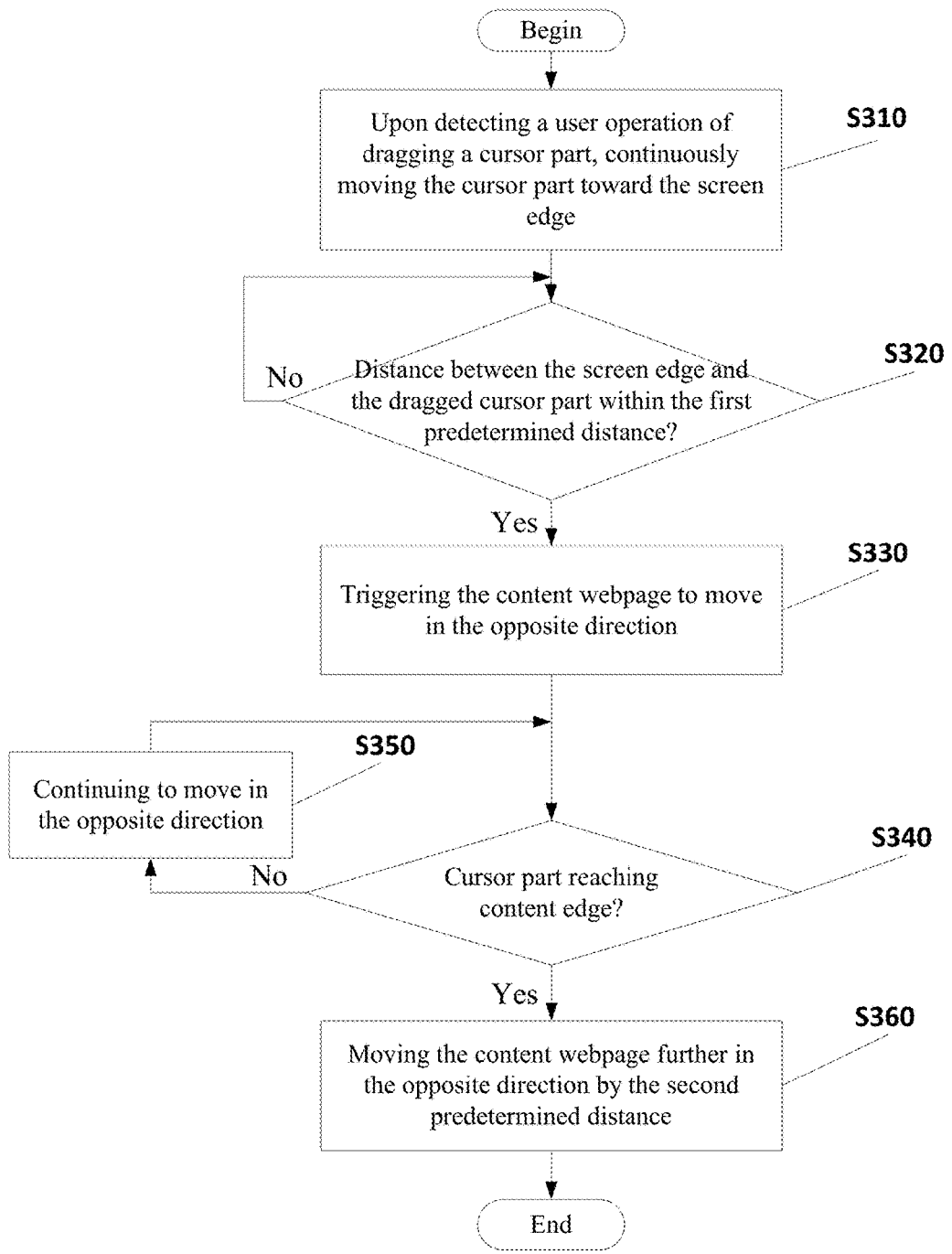
FIG. 3 illustrates a flow chart of a method for selecting and processing the edge content of a content webpage used on a mobile terminal according to the present invention.

FIG. 3 illustrates a flow chart of a method for selecting and processing the edge content of a content webpage according to the present invention. In one embodiment, the method is applied to a mobile terminal. Certainly, the method may be applied to other similar terminals and not limited by the embodiments of the present invention. In the followings, mobile terminals are used as examples for illustration.

When using the web browser on a mobile terminal to browse and process webpages, a user sometimes enters into a text selection mode. Under such circumstance, two cursors usually appear on the touch-screen of a mobile terminal to define the selection area, i.e., the text selection area. In the backend, the locations of at least two cursors are detected. Any one of the two cursors (usually being displayed in pairs) can move horizontally (i.e., along the width direction of the touch-screen) or vertically (i.e., along the height direction of the touch-screen). Usually the length of the touch-screen along the horizontal direction is smaller than the length of the touch-screen along the vertical direction. Hence, one of the two cursors is often dragged in the horizontal direction of the screen. In the followings, the cursor being dragged horizontally is used as an example for illustration.

If a user needs to select, on a mobile terminal screen, the edge content of a content page of a webpage displayed on the mobile terminal, the user needs to perform the operation of dragging the cursor part of the two cursors used to define the selection area toward the screen edge of the touch-screen, to move the text selection area to the edge of the content page, and then to select and process the edge content of the content page.

Here, when the user performs the operation of dragging the cursor part of the two cursors used to define the selection area toward the screen edge of the touch-screen, the operation may be that the user clicks a preset marker displayed on the predetermined area on the touch-screen of the mobile terminal. The preset marker may be an upward, a downward, a leftward, or a rightward arrow displayed on the touch-screen of the mobile terminal, but is not limited thereto. In certain embodiments, the upward arrow indicates dragging the cursor part upward in the vertical direction on the touch-screen of the mobile terminal. The downward arrow indicates dragging the cursor part downward in the vertical direction on the touch-screen of the mobile terminal. The leftward arrow indicates dragging the cursor part from right to left in the horizontal direction on the touch-screen of the mobile terminal. Further, the rightward arrow indicates dragging the cursor part from left to right in the horizontal direction on the touch-screen of the mobile terminal. Accordingly, when the user clicks the upward arrow, the user performs an operation of dragging the cursor part toward the top edge of the touch-screen. When the user clicks the downward arrow, the user performs an operation of dragging the cursor part toward the bottom edge of the touch-screen. Further, when the user clicks the leftward arrow, the user performs an operation of dragging the cursor part toward the left edge of the touch-screen. When the user clicks the rightward arrow, the user performs an operation of dragging the cursor part toward the right edge of the touch-screen.

Further, when the user performs an operation of dragging the cursor part of the two cursors used to define the selection area toward the screen edge of the touch-screen, the operation may be that the user drags the cursor part horizontally or vertically on the touch-screen using a finger(s).

In this case, on the browser side of the mobile terminal, as shown in FIG. 3, at the beginning, in Step S310, when the browser client detects, on the touch-screen of the mobile terminal, an operation performed by the user for dragging the cursor part (i.e., one or both cursors) of at least two cursors used to define the selection area toward the screen edge of the touch-screen, the browser client moves the cursor part (e.g., continuously) toward the screen edge. Under this circumstance, as the cursor part moves, the text selection area gradually extends to the edge of the content page. For example, when dragging horizontally the right-side cursor of the two cursors and leaving the left-side cursor unchanged (i.e., the cursor part being dragged is the right-side cursor of the two cursors), the right end of the text selection area gradually moves toward the right edge of the content page while the left end of the text selection area remains unchanged. When dragging horizontally the left-side cursor of the two cursors and leaving the right-side cursor unchanged (i.e., the cursor part being dragged is the left-side cursor of the two cursors), the left end of the text selection area gradually moves toward the left edge of the content page while the right end of the text selection area remains unchanged. Further, when dragging vertically, the cursor part being dragged may be either the top part or the bottom part of the two cursors. When dragging vertically in the upward direction, the cursor part being dragged is the top part of the two cursors. When dragging vertically in the downward direction, the cursor part being dragged is the bottom part of the two cursors.

After moving the cursor part toward the screen edge, in Step S320, it is determined if the distance between the screen edge in the direction of dragging and the cursor part being dragged is within a first predetermined distance. Here, the first predetermined distance may be any value between about 2 mm and about 8 mm. For example, it may be 3 mm, 5 mm, 7 mm or 8 mm, etc. Preferably, the first predetermined distance is usually 5 mm. Further, the first predetermined distance may be any other suitable value.

When the distance between the screen edge in the direction of the movement of the cursor and the cursor part after the movement of the cursor is not within the first predetermined distance, the browser client continues to move the cursor part and continues to monitor if the distance between the screen edge in the direction of the movement of the cursor and the cursor part after the movement of the cursor is within the first predetermined distance.

When the distance between the screen edge in the direction of the movement of the cursor and the cursor part after the movement of the cursor is within the first predetermined distance, in Step S330, the browser client triggers the content page to move in the direction opposite to the direction of the movement of the cursor.

In Step S340, the browser client checks if the cursor part being dragged reaches the edge of the content of the content page. When it has not reached the content edge, then the browser client executes Step S350, to continue to move the webpage content in the opposite direction and to move the cursor part, and then returns to Step S340.

When the cursor part reaches the content edge of the content page, then in Step S360, the browser client moves the content page further in the opposite direction by a second predetermined distance, bringing the edge of the content closer to the center of the screen than the edge of the screen. Here, the second predetermined distance may be any value between about 2 mm and about 8 mm. For example, it may be 3 mm, 5 mm, 7 mm or 8 mm, etc. Further, the second predetermined distance may be any other suitable value.

Figure 4A:
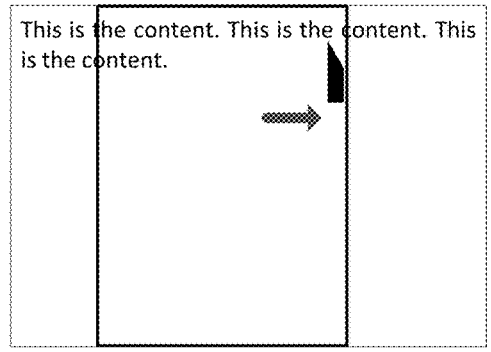
FIG. 4A illustrates a schematic diagram where dragging a cursor part horizontally toward the edge triggers a webpage to roll in the opposite direction.

FIG. 4A illustrates a schematic diagram where dragging the cursor part horizontally toward the edge triggers a webpage rolling in the opposite direction. As shown in FIG. 4A, when the cursor part (right-side cursor) is dragged to approach the right end of the screen, when the movement reaches certain distance, in other words, when the distance between the cursor part and the right end of the screen is within the first predetermined distance, the content webpage is triggered to roll toward the left-side.

Figure 4B:
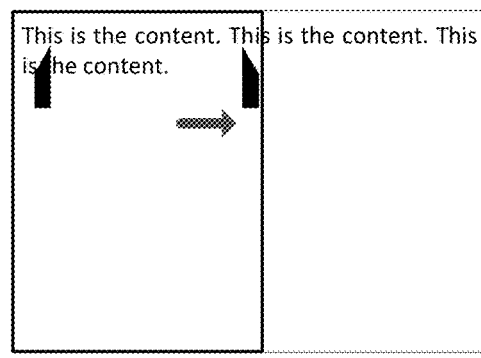
FIG. 4B illustrates a schematic diagram where the selection area is defined by the cursors when the cursor part is dragged horizontally but has not reached the edge part of the screen.

FIG. 4B illustrates a schematic diagram where the selection area is defined by the two cursors when the cursor part is dragged horizontally but has not reached the screen edge.

Figure 4C:
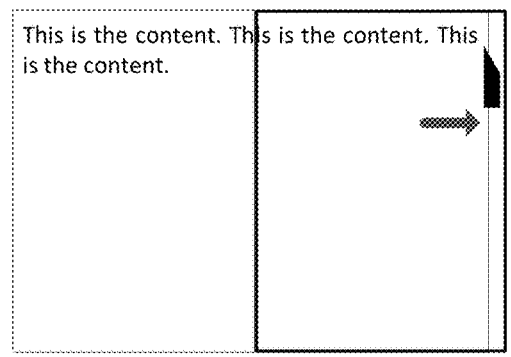
FIG. 4C illustrates a schematic diagram where the webpage is rolling when the cursor part is dragged horizontally to reach the edge part of the screen and touch the content edge.

FIG. 4C illustrates a schematic diagram where the webpage is rolling when the cursor part is dragged horizontally to reach the edge part of the screen and to touch the content edge. As shown in FIG. 4C, when the right-side cursor reaches the content edge of the content page (right-side edge), the content page continues to move toward the left-side by the second predetermined distance, which allows the right-side cursor to select the text at the content edge with desired operation space.

Figure 5:
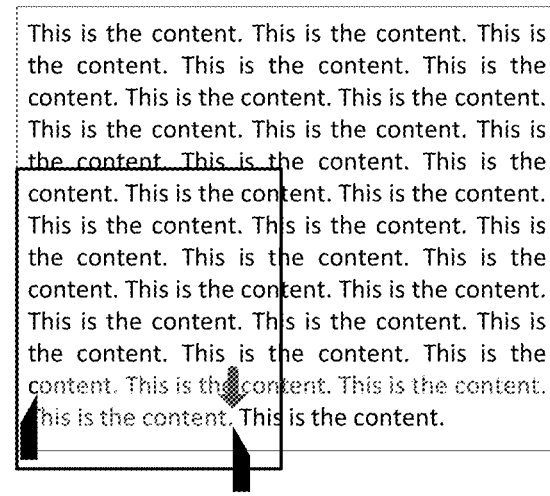
FIG. 5 illustrates a schematic diagram where a webpage is rolling when the cursor part is dragged vertically.

FIG. 5 illustrates a schematic diagram for dragging the cursor part in the vertical direction. It should be noted that dragging the cursor horizontally corresponds to the operation of selecting a single line of text while dragging the cursor vertically corresponds to the operation of selecting multiple lines of text.

Further, the present invention also provides a method for selecting and processing the edge content of a content webpage, which includes the followings.

1) A browser client detects locations of at least two cursors for user to select a content area from a content webpage on the touch-screen of a mobile terminal and movement (e.g., continuous) of one of every two cursors toward the location(s) of the screen edge(s) of the touch-screen.

In other words, when user browses and processes web webpages using the web browser and needs to select a text, under such circumstance, often two cursors appear on the touch-screen (of course, the number of cursors may be multiple of two, for example, four, eight, etc.), the content between every two cursors (i.e., a pair of cursors) is the text content selected by the user, the text selection area. For the backend, the area between the locations of each pair of the cursors is the area of the text content selected by the user.

2) If the distance between the location of the screen edge and the location of the cursor after the movement of the cursor is within a first predetermined distance, the browser triggers the content webpage to move in the direction opposite to the direction of the movement of the cursor.

Optionally, in this step, the browser first checks if the distance between the location of the screen edge and the location of the cursor after the movement of the cursor is within the first predetermined distance. If the distance is within the first predetermined distance, the browser then executes the step of triggering the content webpage to move in the direction opposite to the direction of the movement of the cursor.

The first predetermined distance has been described previously and is not repeated herein.

According to the present invention, when the distance between the location of the screen edge and the location of the cursor after the movement of the cursor is within the first predetermined distance, the content page is triggered to move in the direction opposite to the direction of the movement of the cursor. It enables the user to select the text at the screen edge more effectively and to avoid the problem whereby selecting the text at the screen edge is difficult or even impossible when some inferior capacitive touch-screen devices are used, increasing user satisfaction.

Optionally, in the above embodiments, the described method also includes: when the location of the cursor after the movement of the cursor reaches the location of the content edge of the content page, the content page is moved in the opposite direction by a second predetermined distance, bringing the edge of the content closer to the center of the screen than the edge of the screen.

In other words, when browser detects that the location of the cursor after the movement of the cursor reaches the location of the content edge of the content webpage, the content webpage is moved in the opposite direction by the second predetermined distance, bringing the content edge closer to the center of the screen.

Optionally, detecting locations of the two cursors for selecting the content area from a content webpage on the touch-screen of a mobile terminal by the user includes: detecting the location of the preset marker displayed on a predetermined area of the touch-screen of the mobile terminal that is clicked by the user, wherein the preset marker may be an upward arrow, a downward arrow, a leftward arrow, or a rightward arrow displayed on the touch-screen of the mobile terminal; or detecting the location of the cursor being dragged by the user in the horizontal direction or the vertical direction on the touch-screen.

In this embodiment, the implementation may be similar to that of the above-described method, the details of which are omitted here.

Figure 6:
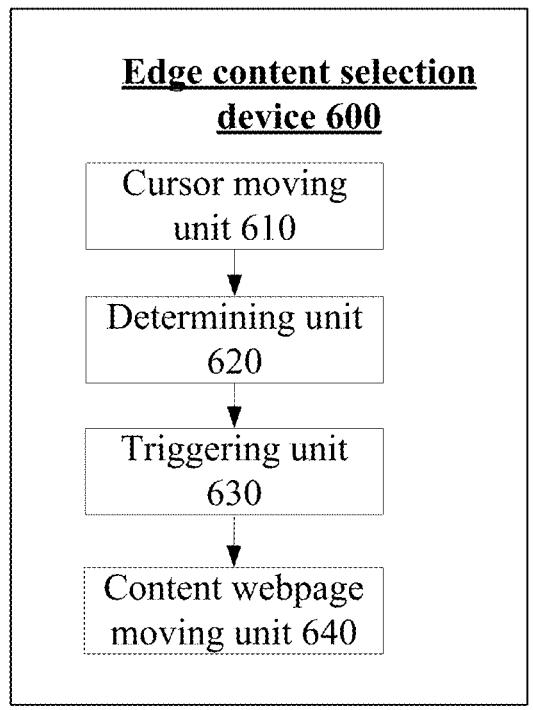
FIG. 6 illustrates a block diagram of an edge content selection device for selecting and processing the edge content of a content webpage used on a mobile terminal according to the present invention.

FIG. 6 illustrates a block diagram of an edge content selection device 600 for selecting and processing the edge content of a content webpage on a mobile terminal according to the present invention.

As shown in FIG. 6, the edge content selection device 600 includes a cursor moving unit 610, a determining unit 620, a triggering unit 630, and a content webpage moving unit 640.

The cursor moving unit 610 is configured to, upon detecting on the touch-screen of a mobile terminal that the user performs the operation of dragging the cursor part of the two cursors used to define the selection area toward the screen edge of the touch-screen, move the cursor part toward the screen edge.

Here, when the user performs the operation of dragging the cursor part of the two cursors used to define the selection area toward the screen edge of the touch-screen, the operation may be that the user clicks a preset marker displayed on the predetermined area on the touch-screen of the mobile terminal. The preset marker may be an upward, a downward, a leftward, or a rightward arrow displayed on the touch-screen of the mobile terminal.

Further, when the user performs an operation of dragging the cursor part of the two cursors used to define the selection area toward the screen edge of the touch-screen, the operation may be that the user drags the cursor part horizontally or vertically on the touch-screen using a finger(s).

The determining unit 620 is configured to determine whether the distance between the screen edge in the direction of the movement of the cursor and the cursor part after the movement of the cursor is within a first predetermined distance. Here, the first predetermined distance may be any value between about 2 mm and about 8 mm. For example, it may be 3 mm, 4 mm, 5 mm, 7 mm or 8 mm, etc. Further, the first predetermined distance may be any other suitable value.

When the distance between the screen edge and the cursor part being dragged is within the first predetermined distance, the triggering unit 630 is configured to trigger the content webpage to move in the direction opposite to the direction of the movement of the cursor.

The content webpage page moving unit 640 is configured to move the content webpage in the opposite direction. Further, when the cursor part being dragged reaches the content edge of the content webpage, the content webpage moving unit 640 is configured to move the content webpage further in the opposite direction by a second predetermined distance, bringing the edge of the content closer to the center of the screen than the edge of the screen. Here, the second predetermined distance may be any value between about 2 mm and about 8 mm. For example, it may be 3 mm, 4 mm, 5 mm, 7 mm or 8 mm, etc. Further, the second predetermined distance may be any other suitable value.

Using the above described edge content selection method and device, the user performs the operation of dragging the cursor part of the two cursors used to define the selection area toward the screen edge of the touch-screen. When the distance between the screen edge and the cursor after the movement of the cursor is within the first predetermined distance, the content webpage is triggered to move in the opposite direction. When the cursor part after the movement of the cursor reaches the content edge of the content webpage, the content webpage is moved further in the opposite direction, bringing the edge of the content closer to the center of the screen than the edge of the screen. As a result, the user is able to select the text at the screen edge more effectively and to avoid the problem whereby selecting the text at the screen edge is difficult or even impossible when some inferior capacitive touch-screen devices are used.

Accordingly, the present invention also provides a device for selecting and processing the edge content of the content page, which includes: a detecting unit and a triggering unit as described in the followings.

The detecting unit is configured to detect locations of at least two cursors for user to select a content area from a content page on the touch-screen of a mobile terminal and movement of one of every two cursors (typically a pair of cursors) toward the location(s) of the screen edge(s) of the touch-screen. The triggering unit is configured to trigger the content webpage to move in the direction opposite to the direction of the movement of the cursor when the distance between the location of the screen edge and the location of the cursor after the movement of the cursor is within the first predetermined distance.

Further, detecting locations of at least two cursors for user to select a content area from a content webpage on the touch-screen of a mobile terminal by the detecting unit includes: detecting the location of the preset marker displayed on a predetermined area of the touch-screen of the mobile terminal that is clicked by the user; or detecting the location of the cursor being dragged by the user on the touch-screen in the horizontal or the vertical direction.

Optionally, in the above embodiment, the device also includes: a content webpage moving unit, configured to move the content webpage in the opposite direction by the second predetermined distance when the location of the cursor after the movement of the cursor reaches the location of the content edge of the content webpage, bringing the edge of the content closer to the center of the screen than the edge of the screen.

The implementation procedures of the functions and roles of individual units of the device correspond to the same of the above method and is not repeated herein.

Figure 7:
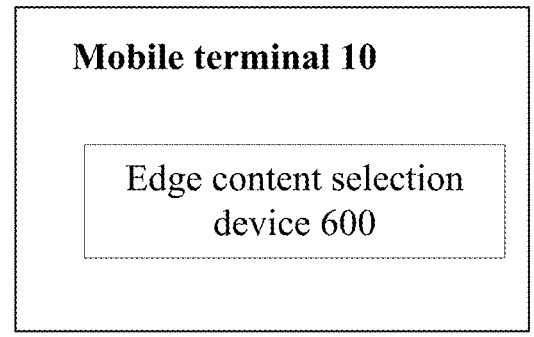
FIG. 7 illustrates a block diagram of a mobile terminal including the edge content selection device shown in FIG. 6.

FIG. 7 illustrates a block diagram of a mobile terminal 10 according to the present invention. As shown in FIG. 7, the mobile terminal 10 includes the edge content selection device 600 shown in FIG. 6. Further, the mobile terminal 10 may also include any variations of the edge content selection device 600.

Another mobile terminal may include: a detecting unit and a triggering unit. Further, the mobile terminal may include a content webpage moving unit. The functions and roles of individual units are described above in detail and will not be duplicated herein.

Further, the mobile terminals according to the present invention may typically be various hand-held terminal devices, such as smart phones, personal digital assistants (PDA), etc. The scope of the present invention should not be limited to any particular type of mobile terminals.

The present invention also provides a computer readable medium storing processor-executable program code, when being executed, for the processor to perform the following procedures: detecting locations of at least two cursors for user to select a content area from a content webpage on the touch-screen of a mobile terminal and movement of one of every two cursors toward the location of the screen edge of the touch-screen; when the distance between the location of the screen edge and the location of the cursor after the movement of the cursor is within the first predetermined distance, triggering the content webpage to move in the direction opposite to the direction of the movement of the cursor.

Further, the methods according to the embodiments of the present invention may be implemented in CPU executable computer program. When executed by CPU, the computer program performs the functions described above according to the embodiments of the present invention.

Further, the procedures of the above methods and the system units may also be implemented in computer programs and executed by a controller (for example, microprocessor) together with computer readable memory device storing the computer programs for the controller to realize the above procedures or unit functions.

Further, it should be understood that the computer readable storage device (for example, memory) described here may be volatile memory or non-volatile memory or both. As examples without limitation, non-volatile memory may include read only memory (ROM), programmable read only memory (PROM), erasable programmable read only memory (EPROM), electrically erasable programmable read only memory (EEPROM) or flash memory. Volatile memory may include random access memory (RAM), which may be used as external high speed buffer memory. As examples without limitation, RAM may be in various forms, such as synchronous RAM (SRAM), dynamic RAM (DRAM), synchronous dynamic RAM (SDRAM), double data rate SDRAM (DDR SDRAM), enhanced SDRAM (ESDRAM), synchronous link DRAM (SLDRAM), or direct Rambus RAM (DRRAM). The memory types disclosed above are intended to include, but are not limited to, these and other suitable types of memory.

It should be understood to those skilled in the art that the combination of the disclosed exemplary logic components, modules, circuits and algorithms may be implemented in hardware, software, or a combination of both. For the purpose of explaining the interchangeability between hardware and software, the functions and roles of the exemplary components, blocks, modules, circuits and procedures are described generally. Whether a particular function is implemented in software or hardware depends on the specific application and the design constraints of the overall system. Those skilled in the art may have a variety of ways to implement the described functions pertaining to specific applications, but such implementation decisions should not be interpreted as causing a departure from the scope of the present invention.

The above embodiments, with reference to the accompanying drawings, are used to describe a webpage edge content selection method and device, and a mobile terminal according to the present invention. However, it should be understood by those skilled in the art that the above described method and device may be improved without departing from the spirit and principles of the present invention. Accordingly, the scope of the protection of the present invention should be determined by the content of the appended claims.

The invention claimed is:

1. A method for selecting and processing content at an edge of a content-containing webpage, comprising:
    detecting, by a processor, locations of a pair of cursors for a user to select an area in the content-containing webpage on a touch-screen of a mobile terminal;
    detecting, by the processor, one cursor of the pair of cursors moving in a direction toward a screen edge of the touch-screen and the one cursor of the pair of cursors moving in the direction toward the screen edge of the touch-screen is dragged in a horizontal direction or a vertical direction by the user to move on top of the content in the content-containing webpage without moving the content along;
    detecting, by the processor, one or more user clicks on a preset marker displayed on a predetermined area of the touch-screen;
    in response to detected clicks on the preset marker displayed on the predetermined area of the touch-screen, dragging the moving cursor to move on top of the content in the content-containing webpage, and wherein the preset marker includes an upward, a downward, a leftward, or a rightward arrow used to drag the moving cursor;
    detecting, by the processor, a distance between a location of the screen edge and a location of the moving cursor is within a first predetermined distance;
    triggering, by the processor, the content-containing webpage to move in a direction opposite to the moving direction of the moving cursor when the detected distance between the location of the screen edge and the location of the moving cursor is within the first predetermined distance;
    detecting, by the processor, that the moving cursor reaches an edge of the content of the content-containing webpage while the content-containing webpage is moving in the opposite direction to the moving direction of the moving cursor;
    moving, by the processor, the content-containing webpage by a second predetermined distance in the opposite direction to the moving direction of the moving cursor when the detected moving cursor reaches the edge of the content of the content-containing webpage to move the edge of the content of the content-containing webpage away from the screen edge of the touch-screen to a center of the touch-screen; and
    selecting, by the processor, the content at the screen edge of the touch-screen in response to moving the edge of the content of the content-containing webpage away from the screen edge of the touch-screen to a center of the touch-screen.

2. The method of claim 1, the step of triggering further comprising: triggering the content-containing webpage to move closer to the center of the touch-screen than the screen edge of the touch-screen.

3. The method of claim 1, wherein detecting, by the processor, locations of a pair of cursors further includes: detecting a location of a preset marker displayed on a predetermined area of the touch-screen of the mobile terminal that is clicked by the user.

4. The method of claim 1, wherein the touch-screen includes a capacitive touch-screen.

5. A device for selecting and processing content at an edge of a content-containing webpage, comprising:
    a processor configured to:
    detect locations of a pair of cursors for a user to select an area in the content-containing webpage on a touch-screen of a mobile terminal;
    detect one cursor of the pair of cursors moving in a direction toward a screen edge of the touch-screen and the one cursor of the pair of cursors moving in the direction toward the screen edge of the touch-screen is dragged in a horizontal direction or a vertical direction by the user to move on top of the content in the content-containing webpage without moving the content along;
    detect one or more user clicks on a preset marker displayed on a predetermined area of the touch-screen;
    in response to the detected clicks on the preset marker displayed on the predetermined area of the touch-screen, drag the moving cursor to move on top of the content in the content-containing webpage, and wherein the preset marker includes an upward, a downward, a leftward, or a rightward arrow used to drag the moving cursor;

detect a distance between a location of the screen edge and a location of the moving cursor is within a first predetermined distance;

trigger the content-containing webpage to move in a direction opposite to the moving direction of the moving cursor when the detected distance between the location of the screen edge and the location of the moving cursor is within the first predetermined distance;

detect that the moving cursor reaches an edge of the content of the content-containing webpage while the content-containing webpage is moving in the opposite direction to the moving direction of the moving cursor;

move the content-containing webpage by a second predetermined distance in the opposite direction to the moving direction of the moving cursor when the detected moving cursor reaches the edge of the content of the content-containing webpage to move the edge of the content of the content-containing webpage away from the screen edge of the touch-screen to a center of the touch-screen; and select the content at the screen edge of the touch-screen in response to moving the edge of the content of the content-containing webpage away from the screen edge of the touch-screen to a center of the touch-screen.

6. The device of claim 5, wherein the processor is further configured to: detect the location of the preset marker displayed on the predetermined area of the touch-screen of the mobile terminal.

7. The device of claim 5, wherein the touch-screen includes a capacitive touch-screen.

8. A device for selecting and processing content at an edge of a content-containing webpage, comprising:

a processor configured to:

detect locations of a pair of cursor parts for a user to select an area in the content-containing webpage on a touch-screen of a mobile terminal;

detect one cursor part of the pair of cursor parts moving in a direction toward a screen edge of the touch-screen and the one cursor part of the pair of cursor parts moving in the direction toward the screen edge of the touch-screen is dragged in a horizontal direction or a vertical direction by the user to move on top of the content in the content-containing webpage without moving the content along;

detect one or more user clicks on a preset marker displayed on a predetermined area of the touch-screen;

in response to the detected clicks on the preset marker displayed on the predetermined area of the touch-screen, drag the moving cursor part to move on top of the content in the content-containing webpage, and wherein the preset marker includes an upward, a downward, a leftward, or a rightward arrow used to drag the moving cursor part;

determine whether a distance between a location of the screen edge and a location of the moving cursor part is within a first predetermined distance;

trigger the content-containing webpage to move in a direction opposite to the moving direction of the cursor part when the distance between the location of the screen edge and the location of the moving cursor part is within the first predetermined distance;

detect that the moving cursor part reaches an edge of the content of the content-containing webpage while the content-containing webpage is moving in the opposite direction to the moving direction of the moving cursor part;

move the content-containing webpage by a second predetermined distance in the opposite direction to the moving direction of the moving cursor part when the detected moving cursor part reaches the edge of the content of the content-containing webpage to move the edge of the content of the content-containing webpage away from the screen edge of the touch-screen to a center of the touch-screen; and select the content at the screen edge of the touch-screen in response to moving the edge of the content of the content-containing webpage away from the screen edge of the touch-screen to a center of the touch-screen.

9. The device of claim 8, wherein the touch-screen includes a capacitive touch-screen.

10. A non-transitory computer readable storage medium storing processor-executable program code, when being executed by a processor, for the processor to perform a method comprising:

detecting locations of a pair of cursors for a user to select an area in the content-containing webpage on a touch-screen of a mobile terminal;

detecting one cursor of the pair of cursors moving in a direction toward a screen edge of the touch-screen and the one cursor of the pair of cursors moving in the direction toward the screen edge of the touch-screen is dragged in a horizontal direction or a vertical direction by the user to move on top of the content in the content-containing webpage without moving the content along;

detecting one or more user clicks on a preset marker displayed on a predetermined area of the touch-screen;

in response to the detected clicks on the preset marker displayed on the predetermined area of the touch-screen, dragging the moving cursor to move on top of the content in the content-containing webpage, and wherein the preset marker includes at least one of an upward, a downward, a leftward, or a rightward arrow used to drag the moving cursor;

detecting a distance between a location of the screen edge and a location of the moving cursor is within a first predetermined distance;

triggering the content-containing webpage to move in a direction opposite to the moving direction of the moving cursor when the detected distance between the location of the screen edge and the location of the moving cursor is within the first predetermined distance;

detecting that the moving cursor reaches an edge of the content of the content-containing webpage while the content-containing webpage is moving in the opposite direction to the moving direction of the moving cursor;

moving the content-containing webpage by a second predetermined distance in the opposite direction to the moving direction of the moving cursor when the detected moving cursor reaches the edge of the content of the content-containing webpage to move the edge of the content of the content-containing webpage away from the screen edge of the touch-screen to a center of the touch-screen; and selecting the content at the screen edge of the touch-screen in response to moving the edge of the content of the content-containing webpage away from the screen edge of the touch-screen to a center of the touch-screen.

11. The non-transitory computer readable storage medium of claim 10, wherein detecting the locations of the pair of cursors further includes: detecting a location of a preset marker displayed on a predetermined area of the touch-screen of the mobile terminal that is clicked by the user.

12. The non-transitory computer readable storage medium of claim 10, wherein the touch-screen includes a capacitive touch-screen.

\* \* \* \* \*